UNITED STATES PATENT OFFICE.

CHAS. LENNIG, OF PHILADELPHIA, PENNSYLVANIA.

IMPROVEMENT IN THE TREATMENT OF HYDROSULPHURETS AND IN MANUFACTURING CARBONATES AND SULPHUR COMPOUNDS.

Specification forming part of Letters Patent No. 8,804, dated March 16, 1852.

*To all whom it may concern:*

Be it known that I, CHARLES LENNIG, in the city of Philadelphia and county of same name, and State of Pennsylvania, have invented and discovered certain Improvements for the Manufacture of Carbonate of Barytes and Strontia, Sulphur, and Sulphuric Acid from Sulphates of Barytes and Strontia; and I do hereby declare that the following is a full and exact description thereof.

The sulphate of strontia or barytes being finely produced is reduced to the condition of a sulphuret by calcination in a suitable vessel or furnace, either by being mixed with the requisite quantities of carbon or carbonaceous substance or by exposure to an incandescent current of carbonic oxide. The sulphuret in contact with water, or, better, entirely dissolved and decanted from any remaining insoluble substance, is placed into close and suitable vessels and a current of carbonic-acid gas produced or generated by any suitable process is made to pass into the liquid. A carbonate of the case of the sulphuret employed precipitates. Sulphureted hydrogen is cooled in the foregoing operation, which, on being conducted through appropriate fixtures, is either ignited in contact with only sufficient atmospheric air to convert its hydrogen into water, or the sulphureted hydrogen is brought into contact with nitrous-acid vapors and an excess of atmospheric air, in both of which methods sulphur will be set free and deposited by conveying the vapors or gases through well-adapted vessels or chambers. To obtain sulphuric acid the sulphureted hydrogen is ignited in an excess of atmospheric air, being thus converted into sulphurous-acid vapors which are then conducted into fixtures usual in the manufacture of sulphuric acid and treated therein in the usual methods. When the decomposition of the liquid sulphuret of barytes or strontia is completed, the same being indicated by the evolution of sulphureted hydrogen gas ceasing, or by testing the liquid under treatment with salt of lead which should not change color, the liquid is drawn off and the precipitated carbonate withdrawn and treated further, as may be desirable.

What I claim as my invention and improvement, and desire to secure by Letters Patent, is—

The manufacture of carbonate of barytes and strontia by processes as above described, and in combination therewith employing the sulphureted-hydrogen gas evolved in the aforesaid process for the producing of sulphur or sulphuric acid.

CHARLES LENNIG.

Witnesses:
 STEPHEN N. SIMMONS,
 CHAS. H. DINGER.